United States Patent [19]
Zupancic et al.

[11] Patent Number: 5,840,827
[45] Date of Patent: Nov. 24, 1998

[54] LOW MOLECULAR WEIGHT HYDROXY FUNCTIONAL POLYESTERS FOR COATINGS

[75] Inventors: Joseph J. Zupancic, Glen Ellyn; Doanld J. Algrim, Palatine; Ronald J. Lewarchik, Sleepy Hollow, all of Ill.; Marc L. Smith, Highland, Calif.

[73] Assignee: Morton International, Inc., Chicago, Ill.

[21] Appl. No.: 63,020

[22] Filed: Apr. 20, 1998

Related U.S. Application Data

[63] Continuation-in-part of Ser. No. 38,520, Mar. 11, 1998.
[51] Int. Cl.$^6$ .................................................. C08G 63/02
[52] U.S. Cl. ........................ 528/272; 528/302; 525/437
[58] Field of Search ................... 528/272, 302; 525/437

[56] References Cited

U.S. PATENT DOCUMENTS

| | | | |
|---|---|---|---|
| 4,104,240 | 8/1978 | Buter | 260/39 P |
| 4,113,702 | 9/1978 | Psencik | 528/75 |
| 4,403,093 | 9/1983 | Hartman et al. | 528/297 |
| 4,480,087 | 10/1984 | Trotter et al. | 528/302 |
| 4,659,778 | 4/1987 | Williams | 525/107 |
| 5,015,724 | 5/1991 | Kawabe | 528/272 |
| 5,346,792 | 9/1994 | Kobayashi et al. | 430/109 |

Primary Examiner—Samuel A. Acquah
Attorney, Agent, or Firm—Robert M. Didrick; Gerald K. White

[57] ABSTRACT

The polyester composition of this invention comprises a polyester oligomer having a number average molecular weight of from about 650 to about 950, a weight average molecular weight of from about 950 to about 1900, and a polydispersity of from about 1.45 to about 2. The hydroxyl value is from about 150 to about 275, and the acid number is less than about 7. Substantially all of the hydroxy groups are primary and from 0 to about 5% of the hydroxy groups are present as pendant hydroxy-alkyl groups. The polyester is formed by a two-stage reaction of monomers consisting of carboxylic anhydrides having from 4 to 34 carbon atoms and polyols having from 2 to 20 carbon atoms. From about 10 to about 50% by weight of the monomers are anhydrides having the formula:

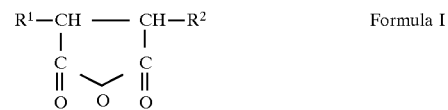

Formula I where $R^1$ is a non-aromatic hydrocarbon radical having from 6 to 30 carbon atoms, $R^2$ is hydrogen or a non-aromatic hydrocarbon radical having from 1 to 8 carbon atoms. The total number of carbon atoms in $R^1$ and $R^2$ is from 8 to 30 carbon atoms. The polyester in conjunction with a hydroxyl-reactive curative provides a coating composition.

21 Claims, No Drawings

5,840,827

LOW MOLECULAR WEIGHT HYDROXY FUNCTIONAL POLYESTERS FOR COATINGS

This is a continuation-in-part of copending application Ser. No. 09/038,520, filed on Mar. 11, 1998.

The present invention relates to low molecular weight, hydroxyl-functional polyesters wherein greater than 95% of the hydroxy groups are chain-terminating and the remainder are in pendant hydroxyalkyl groups. The polyesters of this invention have a number average molecular weight ($M_n$) of from about 650 to about 950, a weight average molecular weight ($M_w$) of from about 950 to about 1900, and a polydispersity of from about 1.45 to about 2. The invention also relates to a method for preparing such oligomeric polyesters and leaving about 2.5% or less by weight of residual monomers. The polyesters can be formulated into coating polymers with appropriate hydroxyl-reactive cross-linking agents. More particularly, the invention is directed to such polyesters having large hydrocarbon side chains which act to reduce viscosity of coating compositions and provide coatings with enhanced flexibility.

BACKGROUND OF THE INVENTION

U.S. Pat. Nos. 4,403,093 and 4,659,778, the teachings of each of which are incorporated herein by reference, teach stepwise growth of polyesters. In stepwise growth, each step of chain elongation is carried out substantially to completion prior to a further polymer chain elongation step. Low molecular weight polyesters produced by such stepwise chain elongation are formulated with appropriate cross-linking agents to form coating compositions.

Substantially linear, low molecular weight, low dispersity, hydroxyl-functional polyesters in which less than 5% of the hydroxyl groups are pendant from the chains are made by end-capping carboxyl-terminated polyesters with mono-oxirane compounds according to co-pending, commonly assigned patent application Ser. No. 08/883,984 which was filed on Jun. 27, 1997.

Of particular interest herein are hydroxyl functional, low-molecular weight polyesters formed by reacting a carboxylic anhydride with an excess of a multi-functional alcohol (polyol) on an equivalents basis so as to provide a hydroxyl-terminated polymer chain without the need of reacting a carboxyl-terminated chain with an oxirane-containing compound. While the polyester of this invention has substantial terminal hydroxyl-functionality, it contains substantially no pendant secondary hydroxyl functionality and a minimal amount of pendant primary hydroxyl functionality in the form of hydroxy-alkyl groups which survive from the small amount of triols used in the formation of the polyesters.

High solids coating compositions with low VOCs may be formulated from such polyesters having low viscosities produced by the method of this invention. Surprisingly, coatings formed from the polyesters of the present invention provide cured coating compositions with enhanced flexibility. Improved pigment wetting is observed through the use of such polyesters in the coating in accordance with the invention.

Above-referenced U.S. Pat. No. 4,659,778 to Williams et al describes a polyester formed by reacting an anhydride with a diol so as to obtain a half-ester and subsequently reacting the half ester with a di-functional oxirane compound so as to form a hydroxyl-terminated polyester. The di-functional oxirane becomes incorporated internally within the polyester chain, providing two hydroxyl groups which are pendent from the chain, i.e., are non-terminal hydroxyl groups. The polyesters are cross-linked to form coatings. For the purposes of the present invention, where a highly flexible coating is desired, a large proportion of pendant hydroxyl groups, whether primary or secondary, are undesirable because that would result in high cross-link density which reduces flexibility of the cured coating.

The prior art teaches against the use of high molecular weight anhydrides, such as dodecenylsuccinic anhydride or octadecenylsuccinic anhydride because of a perceived harm to the physical properties of coatings derived from polyesters made from it. The coatings are said to be too soft. Applicants, herein, find that such high molecular weight anhydrides when incorporated in short chain polyesters of low polydispersity provide coating compositions with low viscosity, excellent pigment wetting and provide coating films with high flexibility.

SUMMARY OF THE INVENTION

It is an object of this invention, therefore, to provide a novel method for preparing a substantially linear, hydroxyl-functional, low molecular weight polyesters having a narrow polydispersity.

It is another object of this invention to provide such substantially linear, hydroxyl-functional, low molecular weight polyesters having a narrow polydispersity.

It is another object of this invention to provide hydroxyl-functional, low molecular weight polyester compositions having less than 2.5% residual monomer content by weight.

It is another object of this invention to provide hydroxyl-functional polyester-based coating compositions having a high solids content and a low viscosity.

It is another object of this invention to provide hydroxyl-functional polyester-based coating compositions having a low volatile organic content (i.e., VOC).

It is another object of this invention to provide hydroxyl-functional polyester-based coating compositions by which thicker film builds without blistering are attainable.

It is another object of this invention to provide hydroxyl-functional polyester-based coating compositions having better flow properties for easier application.

It is another object of this invention to provide hydroxyl-functional polyester-based coatings which have better gloss and depth of image (DOI).

In accordance with the invention, there is provided a polyester composition having a number average molecular weight ($M_n$) of from about 650 to about 950, a weight average molecular weight ($M_w$) of from about 950 to about 1900, a polydispersity of from about 1.45 to about 2, a hydroxyl functionality of between 2 and 3, a hydroxyl value of from about 150 to about 275, and an acid number less than 7. Of the hydroxyl groups in the polyester, all are primary and less than about 5% are pendant from the chain as hydroxy-alkyl groups. Residual monomers amount to a maximum of about 2.5% by weight of the polyester composition.

The coating composition of this invention is prepared by mixing the polyester of this invention, alone or in admixture with other polyesters, with an appropriate hydroxyl-reactive cross-linking agent, such as an aminoplast resin or a blocked isocyanate.

DETAILED DESCRIPTION OF THE PREFERRED EMBODIMENTS

For the purposes of this invention, substantially is a term used herein to mean that the difference between being largely but not wholly that which is specified is so small that it is inconsequential.

Polyester compositions in accordance with the invention are formed by mixing an anhydride of a dicarboxylic acid having from 5 to 34 carbon atoms and a polyol having from 2 to 20 carbon atoms at a ratio of from about 1:1.3 to about 1:1.9 on a molar basis and initiating a polycondensation reaction at a temperature of from about 110° to about 120° C. to ensure that all the anhydride has reacted with a polyol before the resultant half-esters are oligomerized at a temperature of from about 220° to about 230° C. to produce hydroxyl-terminated polyesters of low molecular weight and low polydispersity, which preferably is from about 1.6 to about 1.8. In a preferred method of this invention, the molar ratio of anhydride to polyol is in the range of from about 1:1.5 to about 1:1.8. Mixtures of diols and mixtures of anhydrides often are used; accordingly, the molecular weight of the individual polyester chains will generally vary somewhat, as will the kinds and numbers of mers in the chains. While some monomers having functionality greater than 2 may be used, it is highly desired that the functionality of the polyester chain not exceed 3, lest cross-link density be too high, resulting in brittleness.

If the hydroxyl value of the polyester were less than about 150, the viscosity would be unacceptably high. A coating made from a polyester having a hydroxyl value greater than 275 would be too brittle. If the acid number of the polyester were less than 2, the wetting of pigments in a coating composition would be diminished. On the other hand, an acid number greater than 7 would be harmful to the coating's resistance to methyl ethyl ketone (MEK), its hardness, and its water-absorption. Preferably, the hydroxyl value is from about 180 to about 260 and the acid number is preferably from about 2 to about 5.

The polyols are predominately diols so that the polyesters formed are substantially linear. However, a small amount of triols, e.g., trimethylol propane (TMP) may be used so as to provide branches on some of the polyester chains. Triols are used in an amount sufficient to provide cross-linking to prevent spray gun-stringing of a paint made from the coating composition. Preferably triols comprise no more than about 15 mole percent, more preferably no more than about 5 mole percent, of the total polyol content.

Among the preferred polyols which can be used are: aliphatic polyols, particularly aliphatic diols or triols, most preferably those containing from 2 to 10 carbon atoms. Examples include ethylene glycol; 1,2-propanediol; 1,3-propanediol; 1,4-butanediol; 1,5-pentanediol; glycerol; 1,6-hexanediol; neopentyl glycol; diethylene glycol; 2-methyl-1,3-propanediol; dipropylene glycol; triethyleneglycol; 2,2,4-trimethylpentane-1,3-diol; 2,2-dimethyl-3-hydroxypropyl-2,2-dimethyl-3-hydroxypropionate; 1,4-cyclohexanedimethanol; 1,2,3-butanetriol, trimethylol-ethane, and trimethylol propane. Preferred are those aliphatic diols or triols selected from the class consisting of 2,2,4-trimethylpentane-1,3-diol; 2,2-dimethyl-3-hydroxypropy-2,2-dimethyl-3-hydroxypropionate; 2-methyl-1,3-propanediol; diethylene glycol; dipropylene glycol; 1,6-hexanediol; and trimethylol propane. Preferred polyesters of this invention are prepared from mixtures of polyols wherein hexanediol constitutes at least about 28% and preferably from about 40 to about 70% by weight of the polyol mixture. A polyol mixture containing from about 40 to about 60% hexanediol is particularly preferred. Also preferred are polyol mixtures containing the 2-methyl-1,3-propanediol because of its ability to enhance the hardness of a coating composition without hurting its flexibility.

Higher functionality polyols such as tetrols can be used at very low levels but they are not preferred. An example of a tetrol would be 1,2,3,4-butanetetrol.

Between about 10 and about 50 wt % of the monomers used to form the polyester composition are anhydrides having the formula:

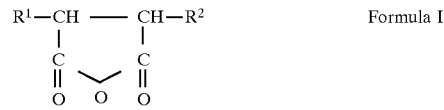

where $R^1$ is a non-aromatic, saturated or unsaturated hydrocarbon radical having from 6 to 30 carbon atoms, $R^2$ is hydrogen or a non-aromatic saturated or unsaturated hydrocarbon radical having from 1 to 8 carbon atoms, and $R^1$ and $R^2$ have, in total, from 8 to 30 carbon atoms. Anhydrides of formula (I) comprise from about 10 to about 50 wt %, preferably from about 20 to about 40 wt %, of the monomers used to form the polyester composition. A preferred monomer of Formula I is dodecenylsuccinic anhydride (DDSA) (alternately named dihydro-3-(tetrapropenyl)-2,5-furandione), generally available as a mixture of isomers. The use of anhydrides of formula (I), such as DDSA and octa-decenylsuccinic anhydride, in the formation of the low molecular weight polyesters of this invention provide low viscosity to liquid polyester compositions and enhanced flexibility of cured coatings. They may be the only anhydride(s) used, but typically they are used in conjunction with other non-aromatic or aromatic anhydrides, such as succinic anhydride, methylsuccinic anhydride, phthalic anhydride, tetrahydrophthalic anhydride, methyltetrahydrophthalic anhydride, hexahydrophthalic anhydride, methylhexahydro-phthalic anhydride, tetrachlorophthalic anhydride, endomethylene tetrahydrophthalic anhydride, chlorendic anhydride, itaconic anhydride, citraconic anhydride, maleic anhydride, and trimellitic anhydride.

To form a curable composition, such as a coating composition, the polyester compositions, as described above, are combined with a cross-linking agent. The cross-linking agent is one which is capable of reacting with the active hydrogens (primarily —OH hydrogens) in the polyester to give a thermoset composition upon curing. Examples of suitable cross-linking agents are aminoplasts and polyisocyanates including blocked polyisocyanates.

Aminoplasts are obtained by the condensation reaction of formaldehyde with an amine or an amide. The most common amines or amides are melamine, urea or benzoguanamine. However, condensation with other amines or amides can be employed. While the aldehyde employed is most often formaldehyde, other aldehydes such as acetaldehyde, crotonaldehyde, benzaldehyde and furfural may be used. The aminoplast contains methylol or similar alkylol groups, and preferably, at least a portion of these alkylol groups are etherified by reaction with alcohol to provide organic solvent-soluble resins. Any monohydric alcohol can be employed for this purpose including such alcohols as methanol, ethanol, butanol and hexanol. Preferably, the aminoplasts which are used are melamine-, urea- or benzoguanamine-formaldehyde condensates etherfied with an alcohol containing 1 to 4 carbon atoms such as methanol, ethanol, butanol or mixtures thereof.

The amount of aminoplast which is used from about 10 to 70 percent by weight, preferably 15 to 50 percent by weight, based on total weight of the aminoplast and polyester. Amounts less than 10 percent by weight usually result in insufficient cure, whereas amounts greater than 70 percent by weight serve no particular benefit.

Polyisocyanates and blocked polyisocyanates may also be used as curing agents. Examples of suitable polyisocyanates include monomeric polyisocyanates such as toluene diisocyanate and 4,4'-methylene-bis(cyclohexyl isocyanate), isophorone diisocyanate and NCO-prepolymers such as the reaction products of monomeric polyisocyanate such as those mentioned above with polyester or polyether polyols. A particularly useful isocyanate is the biuret from 1,6-hexamethylene diisocyanate commercially available from Bayer® AG as Desmodur® N.

Optionally, the polyisocyanate may be blocked. Examples of suitable blocking agents are those materials which would unblock at elevated temperatures such as caprolactam. Blocked isocyanates can be used to form stable one-package systems. Polyfunctional isocyanates with free isocyanate groups can be used to form two-package room temperature curable systems. In these systems, the polyester and isocyanate curing agent are mixed just prior to their application. The amount of isocyanate or blocked poyisocyanate curing agent which is used can vary between about 0.2 to 1.5, preferably from 0.3 to 1.3 equivalents of NCO per equivalent of active hydrogen of the polyester. On a weight basis, the ratio of isocyanate or blocked isocyanate curative relative to polyester is generally within the ranges of weight ratios of aminoplast curative to polyester set forth above.

Because polyester compositions incorporating significant amounts of anhydride monomer of formula (I) have low viscosities, very high solids solutions of the polyesters in organic solvent can be formed and utilized in coating compositions. This affords coating compositions having low VOCs.

The high solids coating compositions preferably contain greater than 50 percent non-volatile solids by volume and contain most preferably greater than 60 percent non-volatile solids by volume.

Besides the polyester oligomer and the crosslinking agent, the high solids coating composition can optionally contain other hydroxyl functional polymers, pigment, liquid diluent, plasticizer, anti-oxidants. UV light absorbers, surfactants, flow control agents, as is well known in the art. Examples of flow control agents are crosslinked polymeric microparticles such as described in U.S. Pat. No. 4,147,688.

Coating compositions employing the polyesters of the present invention are especially suitable for application by coil coating and by spraying, although other conventional methods of coating including brushing, dipping and flow coating can be employed, if desired. Usual spray techniques and equipment are utilized. High solids coatings using the polyesters of the present invention can be applied virtually over any substrate including wood, metal, glass, cloth, plastic, foams and the like, as well as over various primers. Coating compositions employing the polyesters of the present invention are useful for a wide variety of applications. They can be used for coating automotive parts such as automobile bodies and truck cabs. Also, they can be used for other coating applications such as coatings for appliance parts such as refrigerators and washing machines. The coating compositions made possible by the polyesters of this invention are particularly useful for coating the reflectors of lighting fixtures, lightweight mini-blinds, shelves, and the like. The coating may be thicker than the metal substrate and it may be achieved in one pass through a coil coater instead of the two passes required heretofore.

In general, coating thicknesses will vary depending upon the application desired. In general, coatings from about 0.1 to 5 mils have been found to be useful in most applications, and coatings from about 0.8 to 1.2 mils have been found to be more useful.

After application to the substrate, the coatings are cured. Curing is usually conducted at temperatures of about 100° to 260° C., and in most cases, the cure schedule is from about 15 seconds to about 30 minutes. Higher or lower temperatures with correspondingly shorter or longer times can be utilized, although the exact cure schedule best employed depends upon the nature of the substrate, as well as the particular components used in formulating the coating compositions. If a coating is applied on a coil line, the composition is typically cured in a coil oven with a temperature and dwell time determined according to the particular coating composition. With aminoplast curing agents, acid catalysts can be employed, if desired, as they usually permit the use of lower temperature and shorter times for cure.

The polyester compositions of the present invention may be used as the sole polyester component of a coating composition, and coatings formed from such a composition exhibit surprisingly good flexibility.

Polyester compositions of the present invention are also found to be used advantageously as additives to polyester coating compositions, such as those used in coil coating operations. In polyester coating compositions of the prior art, the polyesters typically have number average molecular weights of from about 2000 to about 5000 and OH numbers from about 15 to about 50. Certain advantages are achieved by using such polyesters as the major polyester, i.e., from about 70 to about 90 wt % of the total polyester content, in conjunction with a polyester composition in accordance with the invention as a minor polyester, i.e., from about 10 to about 30 wt %, preferably at least about 20% and more preferably at least about 30%. For example, coating solids levels can be raised, pigment wetting is improved, and surface defects of the applied and cured coating are eliminated.

The invention will be further described by reference to the following examples. Unless otherwise indicated, all parts are by weight percentages based on 100% solids.

EXAMPLE 1

Polyester 1 is formulated as follows (99.87% of solids are monomer components of polyester):

| | | | |
|---|---|---|---|
| 1. | MPDiol (Arco)[1] | monomer | 34.36 |
| 2. | Trimethylopropane | monomer | 0.47 |
| 3. | 1,6-hexanediol | monomer | 11.21 |
| 4. | DDSA[2] | monomer | 28.90 |
| 5. | Phthalic Anhydride | monomer | 30.13 |
| 6. | HHPA[3] | monomer | 0.47 |
| 7. | Triphenyl phosphite | oxidation inhibitor | 0.02 |
| 8. | Fascat 4100 | catalyst | 0.11 |
| 9. | Butyl Acetate | solvent | 11.73 |
| Solids Charge | | 105.67 | |
| Theoretical Losses | | 5.67 | |
| Solids Yield | | 100.00 | |
| Solution Yield | | 111.73 | |

[1]2-methyl-1,3-propanediol
[2]Dodecenylsuccinic Anhydride
[3]Hexadydrophthalic Anhydride Components 1–8 were charged while purging with inert gas. The reactor is slowly heated to 80°–90° C. to melt components; onset of exotherm was observed—cooling was applied as needed to maintain temperature below 110°–115° C., reaction mixture held at temperature for 1 hour. The reaction mixture is heated to 220°–230° C., and viscosity and acid value monitored until a maximum value of 3.5 was obtained. The reactor is cooled to 120° C., and then butyl acetate is added. The properties of the polyester composition are as follows:

| | | |
|---|---|---|
| Viscosity (at 85% Solids): | | Z1 |
| Non-Volatile Materials: | | 85.0 |
| Solvent: | | Butyl Acetate |
| Color: | | 2–3 |
| AV/NV (Acid Value based on Solids): | | 2.0 |
| Weight Per Gallon (WPG): | | 8.89 |
| OHN/NV (Hydroxyl Number Based on Solids): | | 190.3 |
| Appearance: | | Clear |
| NV (Non-Volatile Volume): | | 81.8 |
| GPC Analysis: | Mn: | 770 |
| | Mw: | 1240 |
| | Mz: | 1890 |
| | Dispersity (Mw/Mn): | 1.61 |

EXAMPLE 2

Polyester 2 is formulated as follows (99.88% of solids are monomer components of polyester):

| | | | |
|---|---|---|---|
| 1. | MPDiol (Arco) | monomer | 29.64 |
| 2. | Trimethylopropane | monomer | 0.47 |
| 3. | 1,6-hexanediol | monomer | 16.65 |
| 4. | DDSA | monomer | 28.51 |
| 5. | Phthalic Anhydride | monomer | 29.73 |
| 6. | HHPA | monomer | 0.47 |
| 7. | Triphenyl phosphite | oxidation inhibitor | 0.02 |
| 8. | Fascat 4100 | catalyst | 0.10 |
| 9. | Butyl Acetate | solvent | 11.73 |
| Solids Charge | | | 105.60 |
| Theoretical Losses | | | 5.60 |
| Solids Yield | | | 100.00 |
| Solution Yield | | | 111.73 |

Components 1–8 were charged while purging with inert gas. The reactor is slowly heated to 80°–90° C. to melt components; onset of exotherm was observed—cooling was applied as needed to maintain temperature below 110°–115° C., reaction mixture held at temperature for 1 hour. The reaction mixture is heated to 220°–230° C., and viscosity and acid value monitored until a maximum value of 3.5 was obtained. The reactor is cooled to 120° C., and then butyl acetate is added. The properties of the polyester composition are as follows:

| | | |
|---|---|---|
| Viscosity (at 85% Solids): | | Z+ |
| Non-Volatile Materials: | | 84.7 |
| Solvent: | | Butyl Acetate |
| Color: | | 1 |
| AV/NV (Acid Value based on Solids): | | 2.7 |
| Weight Per Gallon (WPG): | | 8.87 |
| OHN/NV (Hydroxyl Number Based on Solids): | | 187.81 |
| Appearance: | | Clear |
| NV (Non-Volatile Volume): | | 81.5 |
| GPC Analysis: | Mn: | 740 |
| | Mw: | 1210 |
| | Mz: | 1880 |
| | Dispersity (Mw/Mn): | 1.63 |

EXAMPLE 3

Polyester 3 is formulated as follows (99.88% of solids are monomer components of polyester):

| | | | |
|---|---|---|---|
| 1. | MPDiol (Arco) | monomer | 24.94 |
| 2. | Trimethylopropane | monomer | 0.46 |
| 3. | 1,6-hexanediol | monomer | 22.07 |
| 4. | DDSA | monomer | 28.13 |
| 5. | Phthalic Anhydride | monomer | 29.34 |
| 6. | HHPA | monomer | 0.46 |
| 7. | Triphenyl phosphite | oxidation inhibitor | 0.02 |
| 8. | Fascat 4100 | catalyst | 0.10 |
| 9. | Butyl Acetate | solvent | 11.73 |
| Solids Charge | | | 105.52 |
| Theoretical Losses | | | 5.52 |
| Solids Yield | | | 100.00 |
| Solution Yield | | | 111.73 |

Components 1–8 were charged while purging with inert gas. The reactor is slowly heated to 80°–90° C. to melt components; onset of exotherm was observed—cooling was applied as needed to maintain temperature below 110°–115° C., reaction mixture held at temperature for 1 hour. The reaction mixture is heated to 220°–230° C., and viscosity and acid value monitored until a maximum value of 5.0 was obtained. The reactor is cooled to 120° C., and then butyl acetate is added. The properties of the polyester composition are as follows:

| | | |
|---|---|---|
| Viscosity (at 85% Solids): | | Z– |
| Non-Volatile Materials: | | 85.3 |
| Solvent: | | Butyl Acetate |
| Color: | | 2+ |
| AV/NV (Acid Value based on Solids): | | 3.1 |
| Weight Per Gallon (WPG): | | 8.90 |
| OHN/NV (Hydroxyl Number Based on Solids): | | 185.4 |
| Appearance: | | Clear |
| NV (Non-Volatile Volume): | | 82.18 |
| GPC Analysis: | Mn: | 800 |
| | Mw: | 1360 |
| | Mz: | 2110 |
| | Dispersity (Mw/Mn): | 1.70 |

EXAMPLE 4

Polyester 4 is formulated as follows (99.84% of solids are monomer components of polyester):

| | | | |
|---|---|---|---|
| 1. | MPDiol (Arco) | monomer | 28.82 |
| 2. | Trimethylopropane | monomer | 5.18 |
| 3. | 1,6-hexanediol | monomer | 12.84 |
| 4. | DDSA | monomer | 31.54 |
| 5. | Phthalic Anhydride | monomer | 26.40 |
| 6. | HHPA | monomer | 0.45 |
| 7. | Triphenyl phosphite | oxidation inhibitor | 0.02 |
| 8. | Fascat 4100 | catalyst | 0.14 |
| 9. | Butyl Acetate | solvent | 11.73 |
| Solids Charge | | | 105.39 |
| Theoretical Losses | | | 5.39 |
| Solids Yield | | | 100.00 |
| Solution Yield | | | 111.73 |

Components 1–8 were charged while purging with inert gas. The reactor is slowly heated to 80°–90° C. to melt components; onset of exotherm was observed—cooling was applied as needed to maintain temperature below 110°–115° C., reaction mixture held at temperature for 1 hour. The reaction mixture is heated to 220°–230° C., and viscosity and acid value monitored until a maximum value of 5.0 was obtained. The reactor is cooled to 120° C., and then butyl acetate is added. The properties of the polyester composition are as follows:

| | | | |
|---|---|---|---|
| Viscosity (at 85% Solids): | | | Z1 |
| Non-Volatile Materials: | | | 84.2 |
| Solvent: | | | Butyl Acetate |
| Color: | | | 1+ |
| AV/NV (Acid Value based on Solids): | | | 2.2 |
| Weight Per Gallon (WPG): | | | 8.92 |
| OHN/NV (Hydroxyl Number Based on Solids): | | | 219.9 |
| Appearance: | | | Clear |
| NV (Non-Volatile Volume): | | | 80.2 |
| GPC Analysis: | Mn: | | 780 |
| | Mw: | | 1250 |
| | Mz: | | 1900 |
| | Dispersity (Mw/Mn): | | 1.60 |

EXAMPLE 5

Polyester 5 is formulated as follows (99.89% of solids are monomer components of polyester):

| | | | |
|---|---|---|---|
| 1. | MPDiol (Arco) | monomer | 1.39 |
| 2. | Trimethylopropane | monomer | 5.32 |
| 3. | 1,6-hexanediol | monomer | 10.06 |
| 4. | DDSA | monomer | 28.50 |
| 5. | Phthalic Anhydride | monomer | 29.29 |
| 6. | HHPA | monomer | 0.46 |
| 7. | Triphenyl phosphite | oxidation inhibitor | 0.01 |
| 8. | Fascat 4100 | catalyst | 0.10 |
| 9. | MPDiol | monomer | 30.41 |
| 10. | Butyl Acetate | solvent | 11.49 |
| Solids Charge | | | 105.54 |
| Theoretical Losses | | | 5.54 |
| Solids Yield | | | 100.00 |
| Solution Yield | | | 111.49 |

Components 1–8 were charged while purging with inert gas. The reactor is slowly heated to 80°–90° C. to melt components; onset of exotherm was observed—cooling was applied as needed to maintain temperature below 110°–115° C., reaction mixture held at temperature for 1 hour. The reaction mixture is heated to 130°–135° C. and Acid Value monitored, when an acid value of 240.0 is obtained then item 9 is added to the reaction mixture. The reaction mixture is heated to 220°–230° C., and viscosity and acid value monitored until a maximum value of 5.0 was obtained. The reactor is cooled to 120° C., and then butyl acetate is added. The properties of the polyester composition are as follows:

| | | | |
|---|---|---|---|
| Viscosity (at 85% Solids): | | | Z2– |
| Non-Volatile Materials: | | | 84.45 |
| Solvent: | | | Butyl Acetate |
| Color: | | | 1+ |
| AV/NV (Acid Value based on Solids): | | | 2.80 |
| Weight Per Gallon (WPG): | | | 8.90 |
| OHN/NV (Hydroxyl Number Based on Solids): | | | 219.70 |
| Appearance: | | | Clear |
| NV (Non-Volatile Volume): | | | 81.15 |
| GPC Analysis: | Mn: | | 730 |
| | Mw: | | 1160 |
| | Mz: | | 1760 |
| | Dispersity (Mw/Mn): | | 1.59 |

EXAMPLE 6

Polyester 6 is formulated as follows (99.90% of solids are monomer components of polyester):

| | | | |
|---|---|---|---|
| 1. | MPDiol (Arco) | monomer | 1.27 |
| 2. | Trimethylopropane | monomer | 4.84 |
| 3. | 1,6-hexanediol | monomer | 9.15 |
| 4. | DDSA | monomer | 33.02 |
| 5. | Phthalic Anhydride | monomer | 22.69 |
| 6. | HHPA | monomer | 0.42 |
| 7. | Triphenyl phosphite | oxidation inhibitor | 0.01 |
| 8. | Fascat 4100 | catalyst | 0.09 |
| 9. | MPDiol | monomer | 33.54 |
| 10. | Butyl Acetate | solvent | 7.53 |
| Solids Charge | | | 105.04 |
| Theoretical Losses | | | 5.04 |
| Solids Yield | | | 100.00 |
| Solution Yield | | | 107.53 |

Components 1–8 were charged while purging with inert gas. The reactor is slowly heated to 80°–90° C. to melt components; onset of exotherm was observed—cooling was applied as needed to maintain temperature below 110°–115° C., reaction mixture held at temperature for 1 hour. The reaction mixture is heated to 130°–135° C. and Acid Value monitored, when an acid value of 244.0 is obtained then item 9 is added to the reaction mixture. The reaction mixture is heated to 220°–230° C., and viscosity and acid value monitored until a maximum value of 5.0 was obtained. The reactor is cooled to 120° C., and then butyl acetate is added. The properties of the polyester composition are as follows:

| | | | |
|---|---|---|---|
| Viscosity (at 85% Solids): | | | Z2 |
| Non-Volatile Materials: | | | 84.4 |
| Solvent: | | | Butyl Acetate |
| Color: | | | 1–2 |
| AV/NV (Acid Value based on Solids): | | | 3.3 |
| Weight Per Gallon (WPG): | | | 8.90 |
| OHN/NV (Hydroxyl Number Based on Solids): | | | 256.8 |
| Appearance: | | | Clear |
| NV (Non-Volatile Volume): | | | 81.1 |
| GPC Analysis: | Mn: | | 650 |
| | Mw: | | 980 |
| | Mz: | | 1470 |
| | Dispersity (Mw/Mn): | | 1.51 |

EXAMPLE 7

Polyester 7 is formulated as follows (99.88% of solids are monomer components of polyester):

| | | | |
|---|---|---|---|
| 1. | MPDiol (Arco) | monomer | 24.65 |
| 2. | Trimethylopropane | monomer | 0.46 |
| 3. | 1,6-hexanediol | monomer | 21.82 |
| 4. | DDSA | monomer | 27.81 |
| 5. | Phthalic Anhydride | monomer | 0.44 |
| 6. | HHPA | monomer | 30.17 |
| 7. | Triphenyl phosphite | oxidation inhibitor | 0.02 |
| 8. | Fascat 4100 | catalyst | 0.10 |
| 9. | Butyl Acetate | solvent | 11.72 |
| Solids charge | | | 105.46 |
| Theoretical Losses | | | 5.46 |
| Solids Yield | | | 100.00 |
| Solution Yield | | | 111.72 |

Components 1–8 were charged while purging with inert gas. The reactor is slowly heated to 80°–90° C. to melt components; onset of exotherm was observed—cooling was applied as needed to maintain temperature below 110°–115° C., reaction mixture held at temperature for 1 hour. The reaction mixture is heated to 220°–230° C., and viscosity and acid value monitored until a maximum value of 5.0 was obtained. The reactor is cooled to 120° C., and then butyl acetate is added. The properties of the polyester composition are as follows:

| Viscosity (at 85% Solids): | X– |
|---|---|
| Non-Volatile Materials: | 85.1 |
| Solvent: | Butyl Acetate |
| Color: | 2– |
| AV/NV (Acid Value based on Solids): | 4.6 |
| Weight Per Gallon (WPG): | 8.89 |
| OHN/NV (Hydroxyl Number Based on Solids): | 183.2 |
| Appearance: | Clear |
| NV (Non-Volatile Volume): | 81.8 |
| GPC Analysis: Mn: | 790 |
| Mw: | 1300 |
| Mz: | 2010 |
| Dispersity (Mw/Mn): | 1.64 |

EXAMPLE 8

Polyester 8 is formulated as follows (99.89% of solids are monomer components of polyester):

| 1. | MPDiol (Arco) | monomer | 22.92 |
|---|---|---|---|
| 2. | Trimethylopropane | monomer | 0.42 |
| 3 | 1,6-hexanediol | monomer | 20.28 |
| 4. | ODSA[1] | monomer | 33.96 |
| 5. | Phthalic Anhydride | monomer | 26.96 |
| 6. | HHPA | monomer | 0.42 |
| 7. | Triphenyl phosphite | oxidation inhibitor | 0.02 |
| 8. | Fascat 4100 | catalyst | 0.09 |
| 9. | Butyl Acetate | solvent | 14.30 |
| Solids charge | | | 105.07 |
| Theoretical Losses | | | 5.07 |
| Solids Yield | | | 100.00 |
| Solution Yield | | | 114.30 |

[1]Octadecenylsuccinic Anhydride

Components 1–8 were charged while purging with inert gas. The reactor is slowly heated to 80°–90° C. to melt components; onset of exotherm was observed—cooling was applied as needed to maintain temperature below 110°–115° C., reaction mixture held at temperature for 1 hour. The reaction mixture is heated to 220°–230° C., and viscosity and acid value monitored until a maximum value of 5.0 was obtained. The reactor is cooled to 120° C., and then butyl acetate is added. The properties of the polyester composition are as follows:

| Viscosity (at 85% Solids): | V– |
|---|---|
| Non-Volatile Materials: | 83.8 |
| Solvent: | Butyl Acetate |
| Color: | 2– |
| AV/NV (Acid Value based on Solids): | 3.6 |
| Weight Per Gallon (WPG): | 8.66 |
| OHN/NV (Hydroxyl Number Based on Solids): | 171.14 |
| Appearance: | Clear |
| NV (Non-Volatile Volume): | 80.9 |
| GPC Analysis: Mn: | 890 |
| Mw: | 1730 |
| Mz: | 3210 |
| Dispersity (Mw/Mn): | 1.94 |

EXAMPLE 9

Polyester 9 is formulated as follows (99.88% of solids are monomer components of polyester):

| 1. | MPDiol (Arco) | monomer | 24.47 |
|---|---|---|---|
| 2. | Trimethylopropane | monomer | 0.45 |
| 3. | 1,6-hexanediol | monomer | 21.66 |
| 4. | ODSA | monomer | 25.17 |
| 5. | Phthalic Anhydride | monomer | 33.05 |
| 6. | HHPA | monomer | 0.45 |
| 7. | Triphenyl phosphite | oxidation inhibitor | 0.02 |
| 8. | Fascat 4100 | catalyst | 0.10 |
| 9. | Butyl Acetate | solvent | 11.73 |
| Solids charge | | | 105.37 |
| Theoretical Losses | | | 5.37 |
| Solids Yield | | | 100.00 |
| Solution Yield | | | 111.73 |

Components 1–8 were charged while purging with inert gas. The reactor is slowly heated to 80°–90° C. to melt components; onset of exotherm was observed—cooling was applied as needed to maintain temperature below 110°–115° C., reaction mixture held at temperature for 1 hour. The reaction mixture is heated to 220°–230° C., and viscosity and acid value monitored until a maximum value of 5.0 was obtained. The reactor is cooled to 120° C., and then butyl acetate is added. The properties of the polyester composition are as follows:

| Viscosity (at 85% Solids): | W+ |
|---|---|
| Non-Volatile Materials: | 85.5 |
| Solvent: | Butyl Acetate |
| Color: | 2 |
| AV/NV (Acid Value based on Solids): | 3.8 |
| Weight Per Gallon (WPG): | 8.88 |
| OHN/NV (Hydroxyl Number Based on Solids): | 185.93 |
| Appearance: | Clear |
| NV (Non-Volatile Volume): | 82.4 |
| GPC Analysis: Mn: | 820 |
| Mw: | 1490 |
| Mz: | 2600 |
| Dispersity (Mw/Mn): | 1.81 |

EXAMPLES 10–12 & COMPARATIVE EXAMPLE 1

A series of white coating compositions having the formulations shown in Table I were prepared by dispersing components 1–5 on a sand mill to a Hegman grind of 7.5 and then letting down this mill base by adding components 6–27 and mixing under low shear until homogeneous.

TABLE I

| Component | | Example No. | | | |
|---|---|---|---|---|---|
| No. | Description | C.E. 1 | 10 | 11 | 12 |
| 1 | R-4350 (Polyester Resin)* | 28.35 | 18.48 | 23.39 | 36.17 |
| 2 | Aromatic 150 solvent | 1.83 | — | — | — |
| 3 | Butyl Carbitol Acetate | — | 2.12 | 2.65 | — |
| 4 | Aromatic 100 solvent | — | — | — | — |
| 5 | Titanium Dioxide | 33.81 | 49.97 | 36.89 | 37.78 |
| 6 | R-4350 (Polyester Resin) | 15.34 | 9.98 | 14.67 | — |
| 7 | R-2643 (Polyester Resin)** | — | — | — | — |
| 8 | Polyester 1 | — | 7.89 | — | — |
| 9 | Polyester 2 | — | — | 9.64 | — |
| 10 | Polyester 3 | — | — | — | 9.88 |
| 11 | Acrylic Resin | — | 1.38 | 0.58 | 1.05 |
| 12 | RESIMENE 747 (Curative) | 5.15 | — | — | — |
| 13 | RESIMENE 751 (Curative) | — | 5.83 | 7.38 | 7.70 |
| 14 | Acrylic Flow Aid | 0.69 | 0.04 | 0.07 | 0.35 |
| 15 | NACURE 1051 (Catalyst) | 0.37 | — | — | — |
| 16 | NACURE 1557 (Catalyst) | — | 1.29 | 0.82 | 0.84 |
| 17 | SILWET L-7500 Flow Control | — | 0.06 | 0.16 | 0.21 |
| 18 | VERSAFLOW CUT Polyethylene | — | — | — | 0.21 |
| 19 | 2-ethyl hexanol | 1.58 | — | — | — |
| 20 | 1-butanol | 1.58 | — | 2.08 | 2.94 |

TABLE I-continued

| Component | | Example No. | | | |
|---|---|---|---|---|---|
| No. | Description | C.E. 1 | 10 | 11 | 12 |
| 21 | DPGME*** | 1.58 | — | — | — |
| 22 | Butyl Cellosolve | 1.34 | — | — | — |
| 23 | Aromatic 150 | 8.38 | — | — | — |
| 24 | Aromatic 100 | — | — | — | 2.03 |
| 25 | Acetone | — | 1.64 | — | — |
| 26 | Butyl Carbitol Acetate | — | 1.32 | 1.67 | — |
| 27 | Epon 828 (Epoxy Resin) | — | — | — | 0.83 |

*$M_n$ 3520; OH #(NV) 30 ± 3; 65% solids
**$M_n$ 4330; OH #(NV) 18 ± 6; 60% solids
***DPGME is dipropylene glycol methyl ether The compositions in Table I were applied in a coil coating process to aluminum sheet metal to a wet thickness of about 1.15 mils, dried, and then cured under the conditions shown in Table II wherein the coating composition properties and film properties are also shown.

TABLE II

| | Example | | | |
|---|---|---|---|---|
| Properties | C.E. 1 | 10 | 11 | 12 |
| Coating Composition Properties | | | | |
| % Volume Solids | 50.1 | 62.2 | 62.5 | 66.5 |
| Viscosity | 500 cps | 800 cps | 1200 cps | 432 cps |
| WPG (lbs./gallon) | 11.5 | 11.8 | 11.9 | 12.0 |
| VOC | 3.36 | 2.40 | 2.38 | 2.43 |
| Cure Conditions | | | | |
| PMT | 450° F. | 450° F. | 450° F. | 450° F. |
| Dwell Time | 28 sec. | 28 sec. | 28 sec. | 22 sec. |
| Film Properties | | | | |
| Film Thickness (mils) | 0.75–0.80 | 0.75–0.80 | 0.75–0.80 | 0.75–0.80 |
| 60° Gloss | 95.3% | 95.2% | 95.0 | 95.0 |
| Pencil Hardness | H | H | H | H |
| MEK Rubs | 100 | 100 | 100 | 100 |
| T-Bend | Pass 0T | Pass 0T | Pass 0T | Pass 0T |

EXAMPLES 13 and 14 and COMPARATIVE EXAMPLE 2

A series of white coating compositions having the formulations shown in Table III were prepared by dispersing components 1–8 on a sand mill to a Hegman grind of 7.5 and then letting down this mill base by adding components 9–26 and mixing under low shear until homogeneous.

TABLE III

| Component | | Example No. | | |
|---|---|---|---|---|
| No. | Description | C.E. 2 | 13 | 14 |
| 1 | R-2643 (Polyester Resin) | 14.01 | 15.43 | 16.00 |
| 2 | MIAK* | — | 5.14 | 5.19 |
| 3 | Aromatic 150 | 4.67 | — | — |
| 4 | Titanium Dioxide | 28.01 | 30.86 | 30.90 |
| 5 | R-2643 (Polyester Resin) | 0.21 | — | — |
| 6 | MIAK | 0.07 | 0.05 | — |
| 7 | Raven 1040 | 0.03 | 0.03 | — |
| 8 | Polyester 1 | — | 0.23 | — |
| 9 | R-2643 (Polyester Resin) | 33.74 | 27.22 | 26.65 |
| 10 | Polyester 1 | — | 5.45 | — |
| 11 | Polyester 2 | — | — | 5.67 |

TABLE III-continued

| Component | | Example No. | | |
|---|---|---|---|---|
| No. | Description | C.E. 2 | 13 | 14 |
| 12 | Acrylic Resin | 1.06 | 1.10 | 1.10 |
| 13 | RESIMENE 747 (Curative) | 2.71 | — | — |
| 14 | RESIMENE 751 (Curative) | — | 7.09 | 7.09 |
| 15 | CYMEL 325 (Curative) | 1.91 | — | — |
| 16 | Acrylic Flow Aid | 1.06 | 0.06 | 0.06 |
| 17 | NACURE 1051 (Catalyst) | 0.42 | — | — |
| 18 | NACURE 1557 (Catalyst) | — | 0.82 | 0.82 |
| 19 | SILWET L-7500 | 0.21 | 0.21 | 0.21 |
| 20 | VERSAFLOW CUT | 0.21 | — | — |
| 21 | 2-ethyl hexanol | 1.59 | — | — |
| 22 | 1-butanol | 3.18 | 1.85 | 1.85 |
| 23 | Aromatic 150 | 5.31 | — | — |
| 24 | Acetone | — | 1.85 | 1.85 |
| 25 | Butyl Carbitol Acetate | 1.59 | 1.85 | 1.85 |
| 26 | Epon 828 (Epoxy Resin) | — | 0.75 | 0.75 |

*MIAK means methyl isoamyl ketone

The compositions in Table III were applied in a coil coating process to aluminum sheet metal to a wet thickness of about 1.35 mils, dried, and then cured under the conditions shown in Table IV wherein the coating compositon properties and film properties are also shown.

TABLE IV

| | Example | | |
|---|---|---|---|
| Properties | C.E.2 | 13 | 14 |
| Coating Formulation Properties | | | |
| % Volume Solids | 46.8 | 55.1 | 55.1 |
| Viscosity | 620 cps | 560 cps | 580 cps |
| WPG (lbs./gallon) | 10.5 | 10.8 | 10.80 |
| VOC | 3.90 | 3.03 | 3.03 |
| PMT | 450° F. | 450° F. | 450° F. |
| Dwell Time | 28 sec. | 28 sec. | 28 sec. |
| Film Properties | | | |
| Film Thickness (mil) | 0.75–0.80 | 0.75–0.80 | 0.75–0.80 |
| 60° Gloss | 96.2% | 91.0% | 95.3% |
| Pencil Hardness | H | H | H |
| MEK Rubs | 100 | 100 | 100 |
| T-Bend | Pass OT | Pass OT | Pass OT |

EXAMPLES 15 and 16

Two white coatings were prepared with the high solids resins of this invention. Examples 15 and 16 compare the polyester resins of example 2 and 3, respectively. Components 1–4 were dispersed on a sand mill to a Hegman 7.5, then this mill base was let down by adding components 5–11 and mixing under low shear.

TABLE V

| Component | | Example No. | |
|---|---|---|---|
| No. | Description | 15 | 16 |
| 1 | Polyester 2 | 41.15 | — |
| 2 | Polyester 3 | — | 41.15 |
| 3 | Titanium Dioxide | 40.77 | 40.77 |
| 4 | CYMEL 303 (Curative) | 9.06 | 9.06 |
| 5 | Acrylic Resin | 1.30 | 1.30 |
| 6 | NACURE 1557 (Catalyst) | 0.60 | 0.60 |
| 7 | SILWET L-7500 | 0.18 | 0.18 |
| 8 | Acrylic Resin - Flow Aid | 0.15 | 0.15 |
| 9 | Butyl Carbitol Acetate | 2.26 | 2.26 |

TABLE V-continued

| Component | | Example No. | |
|---|---|---|---|
| No. | Description | 15 | 16 |
| 10 | MIAK | 2.26 | 2.26 |
| 11 | 1-butanol | 2.26 | 2.26 |

The compositions in Table V were applied in a coil coating process to aluminum sheet metal to a wet thickness of about 1 mil, dried, and then cured under the conditions shown in Table VI wherein the coating compositon properties and film properties are also shown.

TABLE VI

| | Example | |
|---|---|---|
| Properties | 17 | 18 |
| Coating Composition Properties | | |
| % Volume Solids | 77.00 | 77.00 |
| Viscosity | 860 cps | 720 cps |
| WPG (lbs./gallon) | 12.3 | 12.3 |
| VOC | 1.79 | 1.79 |
| Curing Conditions | | |
| PMT | 450° F. | 450° F. |
| Dwell Time | 28 sec. | 28 sec. |
| Film Properties | | |
| Film Thickness (mil) | 0.75–0.80 | 0.75–0.80 |
| 60° Gloss | 92.8% | 94.9 |
| Pencil Hardness | H | H |
| MEK Rubs | 100 | 100 |
| T-Bend | Fail 3T | Fail 3T |

EXAMPLE 19 AND COMPARATIVE EXAMPLE 3

Two white coatings were prepared with and without the high solids resin of this invention as shown in Table VII. Components 1–6 were dispersed on a sand mill to a Hegman 7.5, then this mill base was let down by adding components 7–29 and mixing under low shear.

TABLE VII

| Components | | Example No. | |
|---|---|---|---|
| No. | Description | C.E.3 | 19 |
| 1 | R-4350 Polyester Resin | 19.79 | — |
| 2 | R-5017* Polyester Resin | — | 12.97 |
| 3 | Polyester 3 | — | 1.35 |
| 4 | Aromatic 150 | 4.52 | 3.15 |
| 5 | 1-butanol | — | 0.41 |
| 6 | Titanium Dioxide | 32.23 | 35.82 |
| 7 | R-4350 | 11.61 | 13.63 |
| 8 | R-2043" Polyester Resin | 2.52 | — |
| 9 | Acrylic Resin | 0.75 | — |
| 10 | Polyester 3 | — | 6.99 |
| 11 | Resimene 747 | 2.74 | — |
| 12 | Resimene 741 | 2.35 | 6.81 |
| 13 | Zeospheres | — | 5.24 |
| 14 | Acrylic Resin | — | 0.23 |
| 15 | R-4350 | 2.58 | — |
| 16 | Aromatic 150 | 2.97 | — |
| 17 | Cab-O-Sil | 0.21 | — |
| 18 | Talc | 1.24 | — |
| 19 | Nacure 1051 | — | 0.35 |
| 20 | PTSA | 0.25 | — |
| 21 | Iso-propanol | 0.25 | — |
| 22 | Flattening Agent | — | 2.27 |
| 23 | Anti-popping Agent | — | 0.30 |
| 24 | Aromatic 150 | 4.58 | 10.48 |
| 25 | 2-ethyl hexanol | 2.00 | — |
| 26 | Butyl Carbitol Acetate | 3.00 | — |
| 27 | Talc | 5.36 | — |
| 28 | Aromatic 150 | 1.00 | — |

*$M_n$ 3570; OH# (NV)32 ± 5; 65% solids
**$M_n$ 2770; OH# (NV)85 ± 5

The compositions in Table VII were applied in a coil coating process to aluminum sheet metal to a wet thickness of about 1.73 mils for C.E.3 and about 2.27 mils for Example 19, dried, and then cured under the conditions shown in Table VIII wherein the coating composition properties and film properties are also shown.

TABLE VIII

| | Example | |
|---|---|---|
| Properties | C.E.3 | 19 |
| Coating Formulation Properties | | |
| % Volume Solids | 49.4% | 55.6% |
| Viscosity | 560 cps | 540 cps |
| WPG (lbs./gallon) | 11.7 | 12.3 |
| VOC | 3.75 | 3.09 |
| PMT | 435° F. | 435° F. |
| Dwell Time | 22 sec. | 22 sec. |
| Film Properties | | |
| Film Thickness | 0.85 mil | 1.25 mil |
| 60° Gloss | 40 | 47.1 |
| Pencil Hardness | H | H |
| MEK Rubs | 100 | 100 |
| T-Bend | Pass 1T | Pass 1T |

COMPARATIVE EXAMPLE 4

The polyester of this comparative example is formulated to a composition ratio of 1.25 moles of glycol to 1.00 mole of anhydride as follows (weight percentages based on 100% solids 99.87% of which are monomer components of polyester):

| 1. | MPDiol (Arco) | monomer | 22.36 |
|---|---|---|---|
| 2. | Trimethylopropane | monomer | 0.42 |
| 3. | 1,6-hexanediol | monomer | 19.79 |
| 4. | DDSA | monomer | 30.76 |
| 5. | Phthalic Anhydride | monomer | 32.07 |
| 6. | HHPA | monomer | 0.50 |
| 7. | Triphenyl phosphite | oxidation inhibitor | 0.02 |
| 8. | Fascat 4100 | catalyst | 0.11 |
| 9. | Butyl Acetate | solvent | 11.49 |
| Solids charge | | | 106.04 |
| Theoretical Losses | | | 6.04 |
| Solids Yield | | | 100.00 |
| Solution Yield | | | 111.49 |

Components 1–8 were charged while purging with inert gas. The reactor is slowly heated to 80°–90° C. to melt components; onset of exotherm was observed—cooling was applied as needed to maintain temperature below 110°–115° C., reaction mixture held at temperature for 1 hour. The reaction mixture was heated to 220°–230° C. and acid value monitored until a value of 3.5 was obtained. The reactor was cooled to 120° C., and then butyl acetate was added: The properties of the polyester composition are as follows:

| Viscosity (at 85% Solids): | Z2+ |
| --- | --- |
| Non-Volatile Materials: | 85.7 |
| Solvent: | Butyl Acetate |
| Color: | 4– |
| AV/NV (Acid Value based on Solids): | 1.6 |
| Weight Per Gallon (WPG): | 9.03 |
| OHN/NV (Hydroxyl Number Based on Solids): | 97.43 |
| Appearance: | Clear |
| NV (Non-Volatile Volume): | 82.4 |

The Z2+ viscosity is higher than desired and will not permit a coating formulation which has increased volume solids without a significant increase in viscosity.

COMPARATIVE EXAMPLE 5

The polyester of this comparative example is formulated to a composition ratio of 2.00 moles of glycol to 1.00 mole of anhydride as follows (weight percentages based on 100% solids 99.89% of which are monomer components of polyester):

| 1. | MPDiol (Arco) | monomer | 28.50 |
| --- | --- | --- | --- |
| 2. | Trimethylopropane | monomer | 0.53 |
| 3. | 1,6-hexanediol | monomer | 25.22 |
| 4. | DDSA | monomer | 24.50 |
| 5. | Phthalic Anhydride | monomer | 25.55 |
| 6. | HHPA | monomer | 0.40 |
| 7. | Triphenyl phosphite | oxidation inhibitor | 0.02 |
| 8. | Fascat 4100 | catalyst | 0.09 |
| 9. | Butyl Acetate | solvent | 11.49 |
| Solids charge | | | 104.81 |
| Theoretical Losses | | | 4.81 |
| Solids Yield | | | 100.00 |
| Solution Yield | | | 111.49 |

Components 1–8 were charged while purging with inert gas. The reactor was slowly heated to 80°–90° C. to melt components; onset of exotherm was observed—cooling was applied as needed to maintain temperature below 110°–115° C., reaction mixture held at temperature for 1 hour. The reaction mixture was heated to 220°–230° C. and the viscosity and acid value were monitored until a value of 3.5 was obtained. The reactor was cooled to 120° C., and then butyl acetate was added. The properties of the polyester composition are as follows:

| Viscosity (at 78% Solids): | T–U |
| --- | --- |
| Non-Volatile Materials: | 78.3 |
| Solvent: | Butyl Acetate |
| Color: | 3– |
| AV/NV (Acid Value based on Solids): | 3.0 |
| Weight Per Gallon (WPG): | 8.88 |
| OHN/NV (Hydroxyl Number Based on Solids): | 305.02 |
| Appearance: | Clear |
| NV (Non-Volatile Volume): | 73.7 |

The resin of this example contains a significant level of low molecular weight polyester and/or unreacted glycol which results in a significant decrease in the solids level in comparison to the resins of this invention. The molecular weight volatile components and the resulting low resin solids make this resin unacceptable.

Although the invention has thus been described in detail for the purposes of enablement and setting forth the best mode for carrying out the invention, it is to be understood variations of the invention as described can be made without departing from the spirit and scope of the invention as claimed.

The subject matter claimed is:

1. A polyester composition comprising a polyester oligomer having a number average molecular weight ($M_n$) of from about 650 to about 950, a weight average molecular weight ($M_w$) of from about 950 to about 1900, a polydispersity of from about 1.45 to about 2, a hydroxyl functionality between 2 and 3, a hydroxyl value of from about 150 to about 275, and an acid number less than about 7, substantially all of the hydroxyl functionality being primary, from 0 to about 5% of the hydroxyl functionality being pendant from the polyester backbone as hydroxy-alkyl groups, the polyester being formed by the reaction of monomers consisting of aromatic and non-aromatic carboxylic anhydrides having from 4 to 34 carbon atoms and polyols having from 2 to 20 carbon atoms; from about 10 to about 50% by weight of the monomers being anhydrides having the formula:

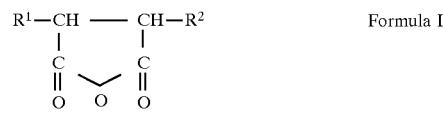

Formula I wherein $R^1$ is a non-aromatic, saturated or unsaturated hydrocarbon radical having from 6 to 30 carbon atoms, $R^2$ is hydrogen or a non-aromatic saturated or unsaturated hydrocarbon radical having from 1 to 8 carbon atoms, and $R^1$ and $R^2$ have, in total, from 8 to 30 carbon atoms.

2. The polyester composition of claim 1 wherein said anhydrides of formula (I) comprise dodecenylsuccinic anhydride.

3. The polyester composition of claim 1 wherein the anhydrides comprise octadecenylsuccinic anhydride.

4. The polyester composition of claim 1 wherein the polydispersity is from about 1.6 to about 1.8.

5. A composition comprising the polyester of claim 1 in combination with a hydroxyl-reactive curative.

6. The polyester composition of claim 1 wherein the monomers consist of the carboxylic anhydride and the polyol at a molar ratio of from about 1:1.3 to about 1:1.9.

7. The polyester composition of claim 6 wherein said molar ratio of anhydride to polyol is from about 1:1.5 to about 1:1.8.

8. The polyester composition of claim 1 wherein from about 28 to about 70% of the polyols by weight is 1,6-hexanediol.

9. The polyester composition of claim 8 wherein from about 40 to about 60% of the polyols is 1,6-hexanediol.

10. In a coating composition comprising a polyester binder, an improvement wherein the polyester binder comprises at least about 10 wt % of the polyester composition of claim 1.

11. In a coating composition comprising a polyester binder, an improvement wherein the polyester binder comprises at least about 20 wt % of the polyester composition of claim 1.

12. In a coating composition comprising a polyester binder, an improvement wherein the polyester binder comprises at least about 30 wt % of the polyester composition of claim 1.

13. A method for preparing a substantially linear, hydroxyl-functional polyester oligomer having a polydispersity of from about 1.45 to about 2, said method comprising initiating a reaction between monomers consisting of aromatic and non-aromatic carboxylic anhydrides having from 4 to 34 carbon atoms and polyols having from 2 to 20 carbon atoms at a temperature of from about 110° to about 120° C. to ensure that substantially all of the anhydrides have reacted with a polyol to form half-esters and then oligomerizing the half-esters at a temperature of from about 220° to about 230° C., said method further characterized by the use of monomers comprising from about 10 to about 50% by weight of anhydrides having the formula:

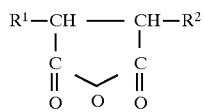
Formula I wherein $R^1$ is a non-aromatic, saturated or unsaturated hydrocarbon radical having from 6 to 30 carbon atoms, $R^2$ is hydrogen or a non-aromatic saturated or unsaturated hydrocarbon radical having from 1 to 8 carbon atoms, and $R^1$ and $R^2$ have, in total, from 8 to 30 carbon atoms.

14. The method of claim 13 wherein the molar ratio of anhydrides to polyols is from about 1:1.3 to about 1:1.9.

15. The method of claim 13 wherein the molar ratio of anhydrides to polyols is from about 1:1.5 to about 1:1.8.

16. The method of claim 13 wherein the anhydrides of formula (I) comprise dodecenylsuccinic anhydride.

17. The method of claim 13 wherein the anhydrides of formula (I) comprise octadecenylsuccinic anhydride.

18. The method of claim 14 wherein from about 28 to about 70% of the polyols by weight is 1,6-hexanediol.

19. The method of claim 14 wherein from about 40 to about 60% of the polyols is 1,6-hexanediol.

20. The method of claim 16 wherein from about 40 to about 60% by weight of the polyols is 1,6-haxanediol.

21. The method of claim 20 wherein the molar ratio of anhydrides to polyols is from about 1:1.5 to about 1:1.8.

* * * * *